March 8, 1955
I. GREENSTADT
2,703,602
ARMREST COVER
Filed Dec. 17, 1953
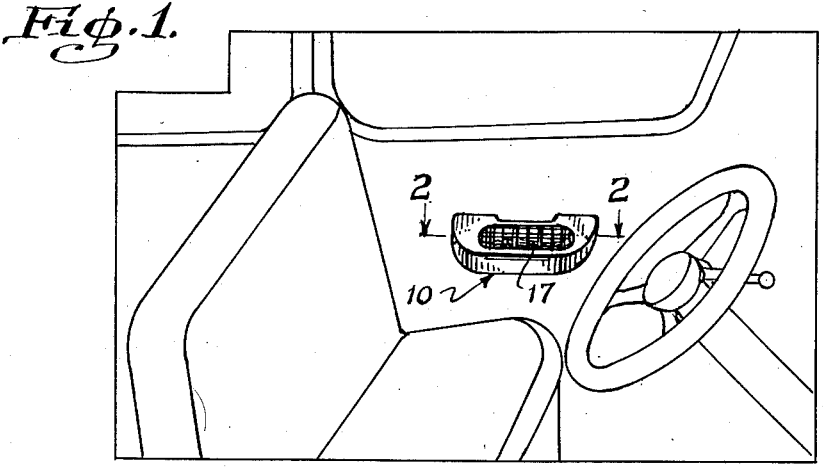
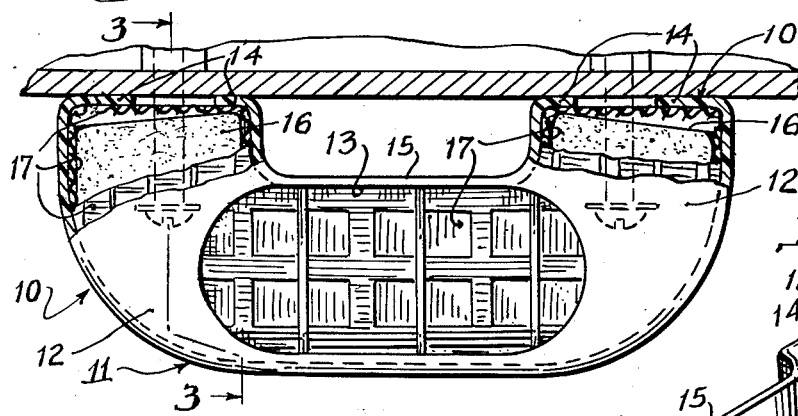
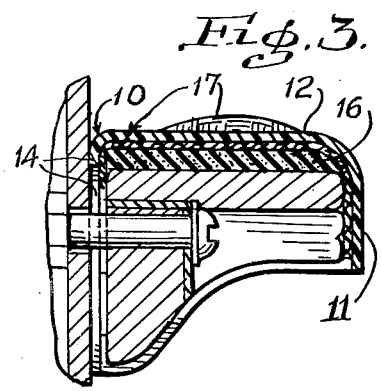
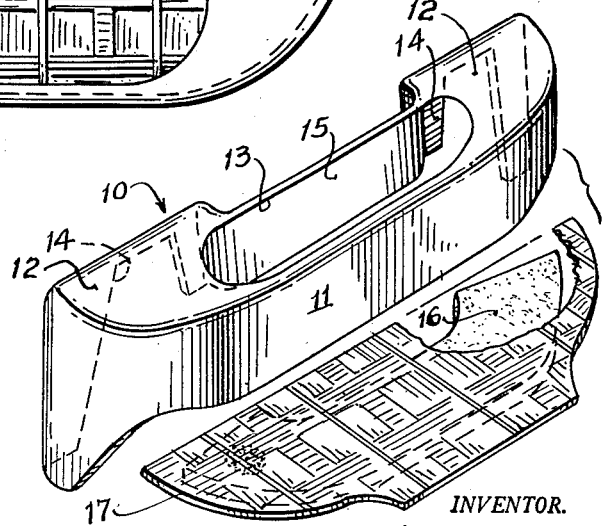
INVENTOR.
*ISIDOR GREENSTADT*
BY
*Robert C. Comstock*
ATTORNEY.

United States Patent Office 2,703,602
Patented Mar. 8, 1955

2,703,602

ARMREST COVER

Isidor Greenstadt, Los Angeles, Calif.

Application December 17, 1953, Serial No. 398,729

3 Claims. (Cl. 155—182)

This invention relates to a cover for the arm rest of an automobile.

It is well known that the arm rests are subjected to greater wear than any other upholstered part of an automobile. This is due to the fact that the driver or passenger constantly rests his arm, elbow or hand on the arm rest.

It is an object of my invention to provide a cover which may be attached over a conventional automobile arm rest quickly, easily and economically without tools and without changing the arm rest construction in any way. It is particularly an object of my invention to provide such a cover which furnishes, when installed, an arm rest which is comparable both in appearance and comfort to the original arm rest of the automobile.

My invention also comprises such other objects, advantages and capabilities as will later more fully appear and which are inherently possessed by my invention.

While I have shown in the accompanying drawings and described herein a preferred embodiment of my invention, it should be understood that the same is susceptible of modification and change without departing from the spirit of my invention.

Referring to the drawings,

Fig. 1 is a perspective view of my device in position in the front seat of an automobile;

Fig. 2 is a horizontal sectional view of my device taken on line 2—2 of Fig. 1;

Fig. 3 is a sectional view of the same taken on line 3—3 of Fig. 2;

Fig. 4 is an exploded perspective view of the component parts of my device.

A preferred embodiment which has been selected to illustrate my invention comprises a body member 10, which is preferably formed of molded plastic material. Body member 10 may be molded as an integral piece of plastic, having a contour which will fit around the conventional automobile arm rest. Body member 10 is provided with a curved front wall 11, which extends around the entire front and side surfaces of the arm rest. A flat top 12 fits over the top of the arm rest and is provided with a large aperture 13 which extends across substantially its entire width and a substantial portion of its length. Body member 10 has two back walls 14, which are provided with inverted U-shaped notches which fit around the bolts fastening the arm rest to the automobile body. A curved inside member 15 fits on the inside of the arm rest where a gap is provided for hand gripping.

A pad 16 is preferably formed of sponge rubber or other suitable material and is similar in contour to the aperture 13. Pad 16 is slightly larger than the aperture 13, but is smaller than the inside of the body member 10, so that it can be placed within the body member 10.

Mounted on one side of pad 16 by gluing or other suitable means is a piece of fabric 17 which preferably corresponds in material and design to the material used in the original upholstery of the automobile. The piece of fabric 17 may, of course, be made of plastic, leather, or any other material as well as cloth.

I may provide a plurality of pads 16 which are already covered with fabric 17 corresponding to the materials used by the manufacturers of automobiles. On the other hand, I may provide only the pad 16, with instructions to the user to add a piece of matching fabric of proper size.

In use, the body member 10 is turned upside down and the pad 16 which is covered with fabric 17 is inserted into the inside of the body member 10 so that the fabric 17 is visible from the outside. If a separate piece of fabric 17 is used, it may be inserted first and then the pad 17 inserted with or without gluing. If a sufficiently large piece of fabric 17 is used, gluing is not necessary to hold the fabric 17 in place.

The entire assembly is then placed over the automobile arm rest. When so installed, it is held firmly in place. The top of the automobile arm rest exerts upward pressure on the sponge rubber pad 16 and fabric 17, causing them to bulge out of the aperture 13 to a height greater than that of the top 12 of body member 10. This results in a rounded contour which is pleasing in appearance and is suggestive of softness and comfort.

The pad 16 and the arm rest both provide a softness for the arm and elbow which is equal to or greater than that of the original arm rest. The color of the body member 10 may be matched to harmonize with the material used in the fabric 17.

It should be noted that with my invention, a harmonizing arm rest cover may be provided easily and quickly with nothing more than a small piece of matching fabric or fabric of the desired color and design. It is unnecessary to cover the arm rest or the arm rest cover with the fabric, which is a tedious and expensive operation. One small swatch of material is sufficient for each arm rest and it need not be secured or tied in any way.

The fabric 17 used in my arm rest may, of course, be of a different color or design, as desired by the user and may be made to match the seat covers instead of the upholstery.

Because the elbow of the user strikes the sponge rubber pad 16, there is no danger of cracking the body member 10. If the arm rest were completely covered with a piece of plastic material, cracking would be extremely likely to occur, destroying the entire cover.

Although body member 10 is preferably formed of plastic for economy, it may be made of metal, composition, or any other suitable material. It is also possible to use a piece of fabric 17 without a pad 16, the fabric being held firmly in place between the inside surface of the top 12 of body member 10 and the top of the automobile arm rest.

I claim:

1. An arm rest cover detachably mountable upon an automobile door arm rest of the type having a hand grip aperture between the arm rest and the door, said cover comprising an elongated substantially U-shaped top wall, front, rear and end apron walls depending from said top wall, said rear apron wall depending into said aperture, said walls following the contour of said arm rest and being adapted to fit closely adjacent thereto, said walls cooperating to hold said cover in protective relation to said arm rest, said top wall having a centrally disposed cutout portion extending longitudinally along a substantial portion thereof, a sponge rubber pad disposed between the bottom of said top wall and the top of said arm rest, said pad being slightly larger than said aperture and of a size to fit within said cover, a piece of material of desired color and design disposed on the side of said pad which is visible through said aperture, said pad and material following the contour of the top of said arm rest and being held between said cover and arm rest said pad and material being adapted to bulge through said aperture due to pressure from the top of said arm rest when said cover is in place on the arm rest.

2. An arm rest cover detachably mountable upon an automobile door arm rest, said cover comprising an elongated top wall, apron walls depending from said top wall around the entire exposed surface area of said arm rest, said walls following the contour of the walls of said arm rest and cooperating to hold said cover in protective relation to said arm rest, said top wall having a centrally disposed cutout portion extending longitudinally along a substantial portion thereof, a sponge rubber pad disposed between the bottom of said top and the top of said arm rest, said pad being slightly larger than said aperture and of a size to fit within said cover, a piece of material of desired color and design disposed on the side of said pad which is visible through said aperture, said pad and material following the contour of the top of said arm rest and being held between said cover and arm rest said pad and material being adapted to bulge through said aperture when said cover is in place on the arm rest.

3. An arm rest cover detachably mountable upon an automobile door arm rest, said cover comprising an elongated top wall, apron walls depending from said top wall around the entire exposed surface area of said arm rest, said walls following the contour of the walls of said arm rest and cooperating to hold said cover in protective relation to said arm rest, said top wall having a centrally disposed cutout portion extending longitudinally along a substantial portion thereof, a piece of non-rigid material disposed within said cover adjacent said aperture, said piece being slightly larger than said aperture and of a size to fit within said cover and extend completely over said aperture, said piece following the contour of the top of said arm rest and being held between the bottom of said cover and the top of said arm rest when said cover is in place on the arm rest.

References Cited in the file of this patent

UNITED STATES PATENTS

| | | |
|---|---|---|
| 1,094,154 | Le Furge | Apr. 21, 1914 |
| 2,201,261 | Frey | May 21, 1940 |
| 2,501,740 | Rhodes | Mar. 28, 1950 |
| 2,520,584 | Underwood et al. | Aug. 29, 1950 |
| 2,565,211 | Doty | Aug. 21, 1951 |
| 2,614,273 | Yancofski | Oct. 21, 1952 |
| 2,633,186 | Jeckell | Mar. 31, 1953 |